Sept. 8, 1970  H. E. THILL  3,527,852
RESINOUS FOAM WITH INTEGRAL SKIN AND PROCESS OF MAKING THE SAME
Filed April 10, 1968

Inventor
Henry E. Thill
By: Olson, Trexler, Wolters & Bushnell
Attys.

United States Patent Office 3,527,852
Patented Sept. 8, 1970

3,527,852
RESINOUS FOAM WITH INTEGRAL SKIN AND PROCESS OF MAKING THE SAME
Henry E. Thill, Wheeling, Ill., assignor to Biwax Corporation, Des Plaines, Ill., a corporation of Illinois
Filed Apr. 10, 1968, Ser. No. 720,282
Int. Cl. B29d 27/00
U.S. Cl. 264—45                                      7 Claims

ABSTRACT OF THE DISCLOSURE

Articles comprising a cellular core and an integral skin are fabricated from thermosetting or cross-linking resins by charging a quantity of an irreversibly reactable resin system into a mold cavity, providing in the cavity a capsule containing a predetermined quantity of foaming agent, the capsule being arranged for selective release of the foaming agent, and then simultaneously revolving and heating the mold to cause a skin of cured resin to form on the surfaces of the mold cavity, selective release of the foaming agent thereafter causing the residual, moving uncured resin to be mixed with the agent and foamed to fill the skin with a cured cellular core coadunated with the skin.

---

This invention relates generally to the manufacture of commercial proructs from foamed resins and, in one particular aspect, to cellular articles made by rotational casting.

In the past, it has been common practice to produce various types of commercial articles, such as seat cushions, automotive sunvisors and the like, with an elastic outer covering or skin of one kind of resinous material and an inner resilient foamed core of a different kind of resinous or polymeric material. Basically, a mold is preheated and charged with a quantity of vinyl plastisol and then rotated while the plastisol gels to form a hollow element. This vinyl "skin" is dumped from the mold and next filled with a foam material. The described procedure is undesirably slow and expensive and requires the inventorying of two different kinds of raw material. It has also been proposed to fabricate a cellular article with an integral skin. U.S. Pat. No. 3,253,066 discloses one such method. However, the latter scheme relies on coalescence of the foamed thermoplastic resins involved to form the integument; and extremely close control of both the amount of material charged and the heating and cooling cycles is required for successfully developing an intact skin. Furthermore, the prior art procedures are limited to products having skins of thermoplastic resin and thus exhibit all of the deficiencies inherent in such materials.

Accordingly, an important object of the present invention is to provide a method of fabricating a foamed article and integral skin from thermosetting or cross-linking resins.

Another object is to provide a method of successfully molding a non-cellular skin and a foamed core from a single charge of thermosetting of cross-linking resins.

Still another object of the invention is to provide a method of the type described in which the article is completed without reopening the mold.

And still another object of the invention is to provide a method of the type described in which conditions within the mold determine the change-over from skin formation to core formation.

A further object of the invention is to provide a new and improved method of rotational casting.

And a still further object of the invention is to provide an article of thermosetting or cross-linking resin comprising a non-cellular skin and a formed core.

These and other objects and features of the invention will become more apparent from a consideration of the following descriptions.

Figure 1:
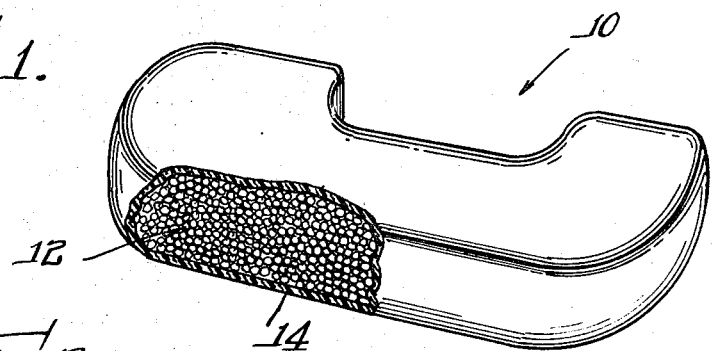
Figure 2:
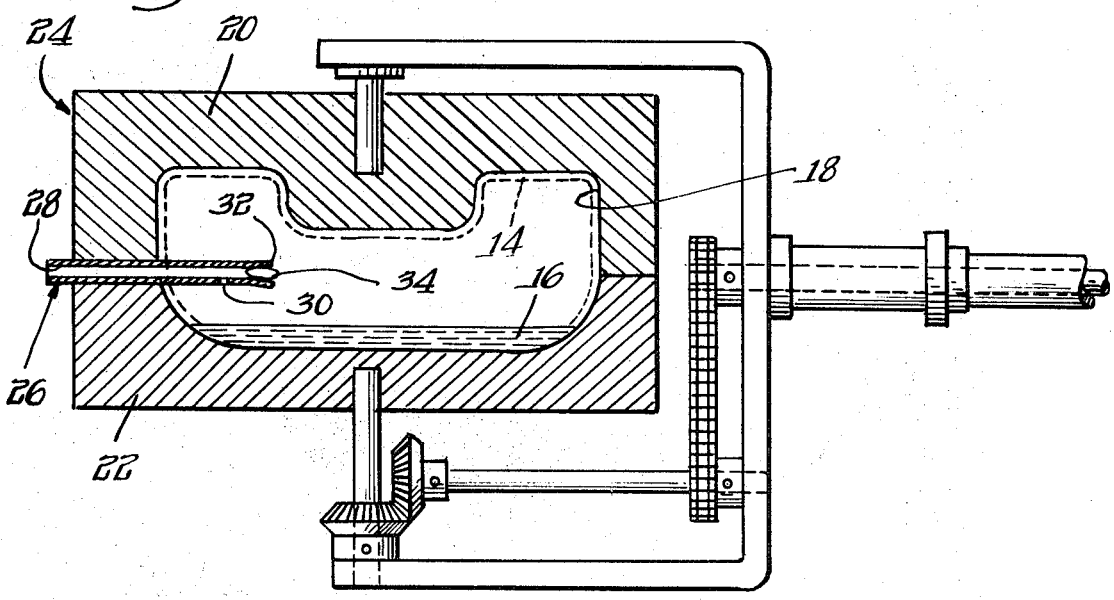
Figure 3:
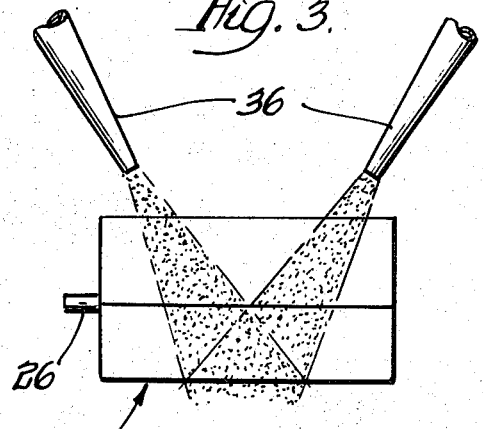
Figure 4:
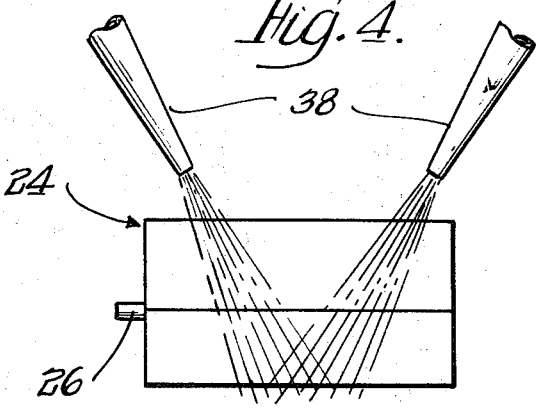

In the drawing:
FIG. 1 is a perspective view of an automotive armrest made in compliance with the invention and shown partly broken away to reveal details of construction;
FIG. 2 is a longitudinal sectional view of molding apparatus for making the armrest of FIG. 1;
FIG. 3 is a schematic view of the apparatus of FIG. 2 shown on a reduced scale and illustrating heating of the mold; and
FIG. 4 is a view similar to the showing of FIG. 3 but illustrating cooling of the mold.

The present invention is useful in the production of numerous articles of the type comprising a cellular core covered with a non-cellular skin, such as for example seat cushions, automotive armrests and sunvisors, life preservers and life jackets, safety belts for water skiing, and a wide range of toys. In accordance with the principles of the present invention, such products are formed from a single charge of thermosetting or cross-linking resin; and resin systems producing cured polyester, epoxy or polysulfide resins are contemplated. However, where a wide range of foam characteristics is desired, including, for example, resilient, semi-rigid and rigid foams, resins producing cured polyurethanes are preferred.

When a polyurethane resin system is to be employed in the practice of the invention, the system advantageously comprises an isocyanate resin, a hydroxyl-rich resin, a catalyst or catalysts, surfactants and other suitable ingredients such as foam stabilizers.

Suitable isocyanate resins include the diisocyanates and the polyisocyanates. In some instances, it is advantageous to provide the isocyanate resin in a form in which it has been partially prereacted with a substance having available hydroxyl groups. Polyols such as glycerol, sucrose, sorbitol and 1–4 butanediol are useful in forming such an adduct. By forming the isocyanate resin as an adduct in this manner, it is possible to control the viscosity of the resin system in both its skin-forming and its core-forming stages. Heat may also be employed to secure suitable viscosities.

Representative hydroxyl-rich resins for reacting with the isocyanate component include polyesters which are the esterification products of a dicarboxylic acid and a polyhydricalcohol. Other representative hydroxyl-rich resins include the polyether polyols.

Specific polyurethane resin systems for use in the practice of the invention are set forth in Table I below.

TABLE 1

| Ingredients | Example 1 | Example 2 | Example 3 | Example 4 |
|---|---|---|---|---|
| Polyoxyalkylene glycol prepolymer | 100 | | | |
| Polyoxypropylene glycol prepolymer (−NCO 1-25) | | 100 | | |
| Castor oil based prepolymer | | | 100 | |
| Plasticizer | 5 | 5 | | 0–5 |
| Triethylamine | 0–1 | 0–1 | 0–1 | 0–1 |
| Lead octoate | 0–1 | 0–1 | 0–2 | 0–1 |
| Castor oil | | | 20–80 | |
| Silicone oil | 0–0.5 | 0–0.5 | 0–0.5 | 0–0.5 |
| Inert fillers (silica) | 0–100 | 0–100 | 0–100 | 0–100 |
| Water | 0–2 | 0–2 | 0–3 | 0–3 |
| TDI (2, 4-tolylene diisocyanate) | | | | 100 |
| Polyols, M.W. 200-4000 | | | | 0–80 |
| Diols, M.W. 400-2000 | | | | 0–80 |
| Triols, M.W. 500-3000 | | | | 0–80 |

NOTE.—Proportions of ingredients are expressed in parts by weight.

In accordance with the present invention, cellular articles having an integral skin are prepared from a single charge of a suitable, reactable resin system as detailed herein. The present invention contemplates the formation of such articles in the cavity of a molding die; and hereinafter, the fabrication of such articles by rotational casting methods will be described for purposes of explanation and illustration. The invention is not to be restricted to such procedures however.

Referring to the drawing, specifically to FIG. 1, an article of the type contemplated by the invention, in particular, an automotive armrest 10, is shown to comprise a core 12 of foamed and cured resin and a skin 14 of the same resin as the core over at least a portion of the core and coadunated therewith. The resin system used in fabricating the armrest 10 is selected so that the skin 14 possesses the desired degree of toughness and elasticity; and the foaming agent used in developing the cellular core 12 is selected, as will be described more fully hereinafter, to generate the foam forming the core 12 with a desired degree of resiliency and other physical properties. For example, polyurethane foam densities can be readily made to vary from about 3 or 4 pounds per cubic foot to about 40 pounds per cubic foot by the addition of surfactants such as silicone oils to the resin system whereby to tend to collapse the forming cells or by adjusting the amount of blowing agent employed, the temperature of molding or the isocyanate content of the resin system.

Considering FIG. 2, the article of the invention, such as the armrest 10, is produced by charging a selected quantity of an irreversibly reactable resin system 16 into a cavity 18 defined between upper and lower parts 20 and 22 of a molding die 24. In compliance with the present invention, the molding die 24 is vented to the atmosphere as by a tubular member 26 held between the die parts 20 and 22 using suitably dimensioned, mating grooves or other means. In compliance with the disclosed embodiment, the tubular member 26 is fashioned with a central channel 28 and a lateral vent opening 30 of lesser cross-sectional area than the channel 28. The lateral vent opening 30 is spaced from an inner end portion 32 of the member 26 so that a capsule 34 or other selectively releasable container device may be fixed in the channel 28 without obstructing the vent opening 30. As will be described more fully hereinbelow, the capsule 34 or its equivalent is intended to open the channel 28 at a particular stage in the molding cycle. However, it is to be realized, that until such event occurs, the lateral vent opening 30 serves to prevent the build-up of excessive gas pressures in the mold cavity 18, as for example would be experienced upon expansion of the air in the headspace over the charge of resin system 16 upon heating of the molding die 24.

The capsule 34 or its equivalent is intended to contain a predetermined amount of a foaming agent that is active with the particular resin system used in the charge 16; and in compliance with the features of the present invention, one or more walls of the capsule 34 are fabricated from a material which responds to conditions within the closed molding die for selective release of the content blowing agent. Exemplary foaming agents for use with polyurethane resins systems include such materials as water and various fluorocarbon blowing agents, for example trichlorofluoromethane. When water is employed, it reacts with the isocyanate component of the resin system to produce carbon dioxide gas that actually serves as the blowing agent. Other foaming agents may, of course, be employed.

Regardless of the specific blowing agent utilized, the capsule 34 is intended to comprise a membrane which isolates the agent until that stage in the molding cycle occurs wherein it is desired to convert from skin formation to core formation. Thus, the "capsule" may comprise a film or membrane totally enclosing the blowing agent or it may comprise spaced membranes sealed in the end portion 32 of tubular member 26 to confine the blowing agent therebetween.

Selective release of the blowing agent is accomplished, for example, by forming the enclosure portion of capsule 34 to be liquified by an increase in the temperature of the molding die 24 and its contents or by forming such membrane to be soluble in the resin system of charge 16. Examplary thermoplastic materials for use in forming the membrane portion of capsule 34 include ethylene-vinyl acetate copolymers and blends of such copolymers with microcrystalline and paraffin waxes. These materials exhibit fairly sharp melting ranges in the general range of temperatures normally expected in the molding die 24. Low molecular weight polyolefins also exhibit such characteristics and therefore may be utilized. Soluble materials for the membrane portion of capsule 34 include such substances as gelatin.

In accordance with yet another feature of the present invention, the capsule 34 is disposed within the mold cavity 18 at or about the point of last solidification of the resinous charge. Thus, the tubular member 26 may continue to serve its venting function throughout the foaming stage whereby to insure a complete core formation without appreciable voids.

After the charge 16 is filled into the mold cavity and the die closed, the die itself is biaxially rotated in accordance with conventional rotational casting practice in order that the resinous system may be intimately mixed and contacted with the surfaces of the mold cavity 18. The geometry of the article being cast determines the relative rotational speeds about the individual axes, and speeds of 40 r.p.m. about the major axis are representative. Simultaneously with the revolving of the molding die, heat is applied thereto in order to promote cross-linking where the resin system cures by that mechanism or to promote such other type of curing as the resin system requires, as for example condensation. Various types of heating may be employed as is well known in the rotational casting art. For example, heated salt may be discharged from nozzles 36 over the surfaces of the revolving die 24 as is suggested in FIG. 3. Hot air or steam may also be employed as heating mediums; and while the simultaneous revolving and heating of the die 24 and its resinous contents constitutes a procedure that is conventional in the rotational art, the processes occurring within the molding die 24 are unique. At first, the charge of reactable resin is made more liquid as the molding die warms, and this fluid mass contacts the surfaces of the cavity 18 and is intimately mixed by the biaxial rotation of the die. This heating and intimate mixing promotes a relatively rapid cure of the resin system at the surfaces of the cavity regardless of the mechanism by which the system cures. In any event, the curing resin forms a non-cellular skin on the surfaces of the mold cavity 18, and a relatively slow speeds of rotation have proved advantageous in forming such an integument. Skin thickness varying from about one mil to about one-quarter inch may be achieved in the practice of the invention.

As the temperature of the die 24 continues to increase, sufficient heat will eventually be transmitted to the capsule 34 to cause the same to melt where a thermoplastic membrane is employed or there will be a sufficient contact between the resin system and the capsule to cause solvation of the membrane where a soluble material is employed. Upon such liquifaction of the capsule 34, the channel 28 of tubular member 26 will be opened and the foaming agent contained in the capsule will be released to contact and mixing with the residual, moving, uncured resin. Activity of the blowing agent then expands the remaining reactable resin causing the same to foam and fill the previously formed skin with a cellular core. It is to be realized that, as these occurrences take place, the curing skin and the walls of the cells of the curing core are integrally united, flowed and cured together. Upon release of the blowing agent, it may be advantageous to revolve the molding die 24 at relatively faster speeds. Where a comparatively high density foam is desired and where the charge of resin is correspondingly great, relatively high rotational speeds may be employed in the foaming stage in order to tend to collapse a certain proportion of the cell walls and produce the desired density in the resultant foam.

When the activity of the foaming agent is substantially completed and the resinous system substantially cured, the molding die 24 is transferred to a cooling chamber where sprays of water 38, as is indicated in FIG. 4, or other cooling means are directed over the die. When the die has cooled, it is opened and the completed article discharged from the cavity 18.

The manner in which the present invention may be practiced and the purposes to which it may be put will be evident from the foregoing descriptions.

The specific embodiments herein shown and described should be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. The process of molding a cellular article with an integral skin comprising the steps of: charging a quantity of an irreversibly reactable resin system selected from the class consisting of polyester, epoxy, polysulfide and polyurethane resin, into a mold; providing in said mold a capsule containing a foaming agent for said resin system, said capsule being arranged for selective release of said agent; then simultaneously revolving and heating said mold to cause a skin of cured resin to form on the surfaces of the mold cavity; and thereafter to bring about release of said foaming agent in continuation of movement of the closed mold whereby to cause the residual, moving uncured resin to be mixed with said agent and foamed and cured filling said skin with a cured cellular core of the same resinous composition as said skin; and discharging said integral skin and core from said mold.

2. The process according to claim 1 wherein said capsule is of thermoplastic material and wherein said mold is heated to melt said capsule for release of said foaming agent.

3. The process according to claim 1 wherein said capsule is of material capable of being solvated by said resin system and wherein said capsule is contacted by said resin system for release of said foaming agent.

4. The process according to claim 1 wherein said mold includes a vent member and wherein said capsule is mounted on said vent member for selectively sealing the same during formation of said skin.

5. The process according to claim 4 wherein said vent member is disposed in said mold above the normal level of said resin system and wherein said capsule is of thermoplastic material.

6. The process according to claim 1 wherein said resin system cures to a polyurethane.

7. The process according to claim 1 wherein said mold is revolved about two axes disposed at right angles relative to each other.

References Cited

UNITED STATES PATENTS

| | | | |
|---|---|---|---|
| 3,161,436 | 12/1964 | Hood | 264—46 XR |
| 3,299,914 | 1/1967 | Harmon | 264—45 |
| 3,426,110 | 2/1969 | Kesling | 264—46 |

JULIUS FROME, Primary Examiner

L. GARRETT, Assistant Examiner

U.S. Cl. X.R.

264—54, 71